Patented Feb. 6, 1940

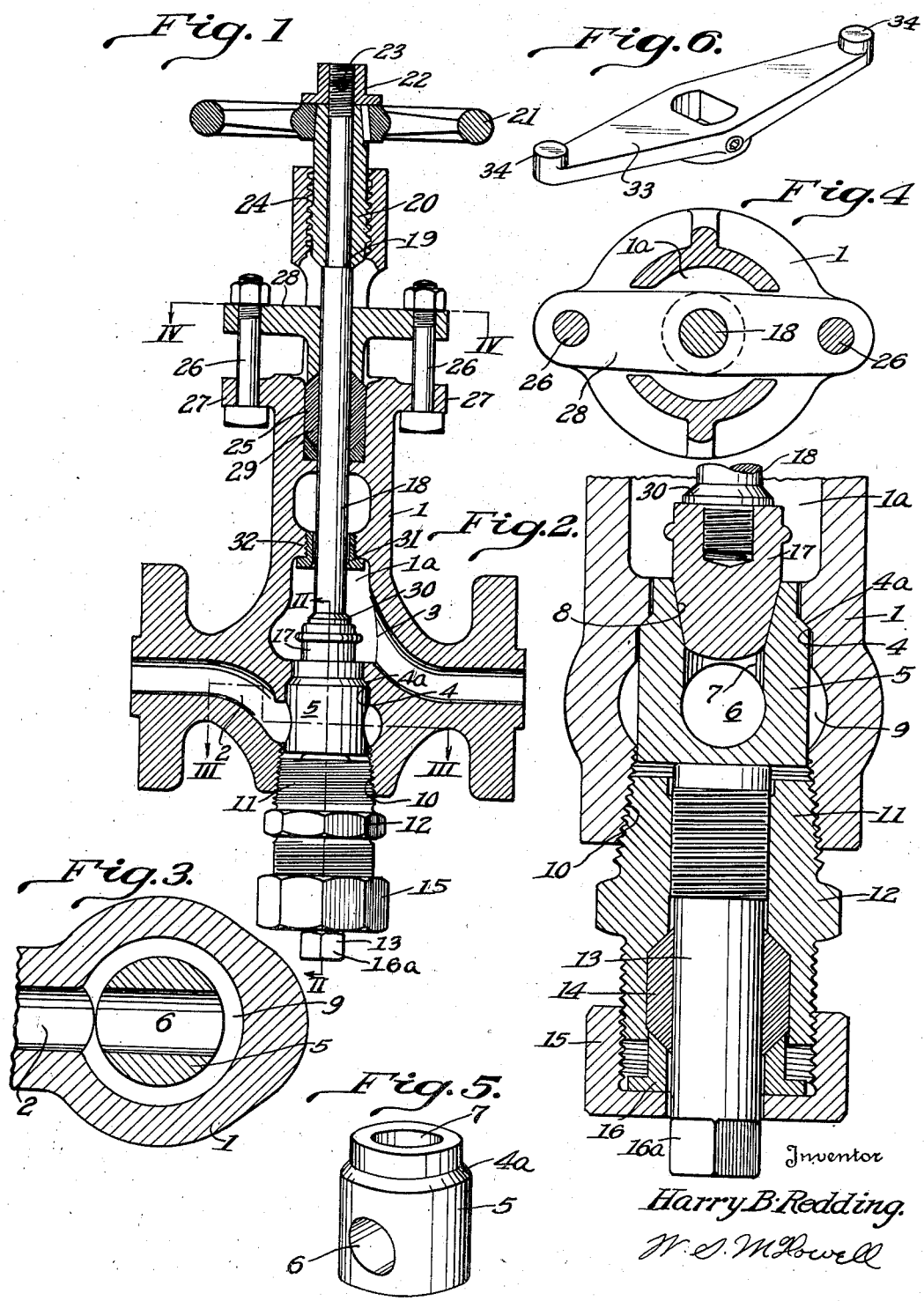

2,189,324

UNITED STATES PATENT OFFICE 2,189,324

CONTROL VALVE

Harry B. Redding, Cleveland, Ohio, assignor of one-half to James S. Van Nostrand, Columbus, Ohio, and one-half to Harry Bodin, Cleveland, Ohio Application October 14, 1936, Serial No. 105,553
Renewed July 19, 1939

4 Claims. (Cl. 251—167)

This invention pertains to control valves of the type employed in oil and steam industries for the purpose of controlling the flow of fluids at high temperatures and pressures.

Valves of this type, now in general use, are often formed with replaceable seats to provide for easier and more economical repair, but, due to the high pressures and temperatures employed, their failure is premature. This is largely due to the expansion of the valve casing while under high temperature which permits fluid flow between the replaceable seat and the valve body. This fluid flow wears away the body and the leaks increase to such an extent that the entire valve must be replaced. This results in great expense as well as loss of time. It is, therefore, an object of the present invention to provide a valve of this type which will render efficient service for longer periods of time.

It is also an object of the invention to provide a valve with a seat which is adjustable relative to the body to compensate for any difference of expansion between the two members.

It is a further object to construct the valve so that the adjustment of the seat can be performed from the exterior of the valve and while the same is in active use.

A still further object of the invention resides in the construction of a valve wherein the valve disk may either be non-rotatable or rotatable with respect to the seat when the valve is opened or closed.

Another object of the invention is the construction of a valve in which the valve stem can be repacked while the valve is in active use.

With these and other objects in view which will appear as the description proceeds, the invention consists in the novel construction and arrangement of parts as set forth in the following description taken in connection with the accompanying drawing in which:

Fig. 1 is a vertical longitudinal sectional view with parts in side elevation of a valve constructed in accordance with the present invention;

Fig. 2 is an enlarged vertical sectional view through the lower portion of the valve, the plane of the section being indicated by the line II—II of Fig. 1;

Fig. 3 is a horizontal sectional view on the plane indicated by the line III—III of Fig. 1;

Fig. 4 is a similar view on the line IV—IV of Fig. 1;

Fig. 5 is a detail perspective view of the replaceable seat member used in the valve;

Fig. 6 is a perspective view of a special wrench used in connection with the valve.

Referring more particularly to the drawing, the numeral 1 designates the body of the valve. This body may be formed of a metallic casting and includes a vertical central bore 1a and a pair of substantially horizontally extending passageways 2 and 3 which form inlet and outlet ports and communicate with the central bore at different levels. The central bore at a point between the upper and lower horizontal passageways is provided with an angular, annular shoulder 4 against which rests a similar shoulder 4a formed on a sleeve-like valve seat 5 removably positioned in the central bore. The sleeve-like seat insert member 5 is provided with a transversely extending bore 6 which communicates with a central opening 7 extending downward from the top of the seat member 5 to the bore 6. The upper portion of the opening 7 is inwardly tapered to form a valve seat 8. The valve body 1 is grooved around the member 5 to form an annular passageway 9 which is in open communication with the ends of the bore 6 and the inlet passage 2.

To hold the insert member 5 in position with the shoulder 4a in engagement with the body shoulder 4, the lower end of the bore 1a is threaded as at 10 to receive the similarly threaded end 11 of a packing cup 12. An adjusting stud 13 is threadedly received within the cup 12 with the upper end thereof in engagement with the bottom of the member 5. The lower portion of the stud is surrounded by the packing 14 and a nut 15 is threaded on the lower end of the cup 12 to cause a follower 16 to exert pressure on the packing 14 for preventing leakage around the stud 13.

The lower end of the stud is squared as at 16a for the reception of a wrench. It will be seen that when the stud is turned, the member 5 will be adjusted toward and away from the shoulder 4. When the valve is subjected to high temperature and the body expands sufficiently to permit leakage between the seat insert and itself, the stud may be turned to move the insert into firmer engagement with the body and further leakage will be prevented.

To control the flow of fluid through the valve and past the seat 8, a valve plug or disk 17 is adjustably positioned in engagement with the seat. This disk is formed with a tapering lower portion to fit the seat and at its upper portion is provided with a threaded socket to receive the lower end of a stem 18 which extends axially of the bore 1a and projects from the upper end of the body. The stem 18 is formed with a shoulder 19 which is spaced from its upper end and is engaged by an adjusting sleeve 20 surrounding the upper end of the stem. A hand wheel 21 is keyed to the upper end of the sleeve 20 and a nut 22 threaded on the upper end of the stem, holds the hand wheel to the sleeve and the latter against the shoulder on the stem. The nut is secured against loosening by a pin 23 passing transversely through it and the stem. Externally, the sleeve 20 is provided with threads 24 which cooperate with similar threads formed in the upper end of the body 1 to cause vertical movement on the part of the sleeve. Due to the sleeve being confined between the shoulder and the nut on the stem, the latter will move vertically in unison with the former.

Intermediate of the upper portion of the body, a packing gland 25 is positioned to eliminate the escape of fluid around the stem when the valve is subjected to high pressure. A pair of bolts 26 extending through ears 27 cast integrally with the body, and the outer ends of a follower member 28 serve to exert pressure on the packing 29 and prevent leakage.

If it is desired to repack the gland 25 while the valve is under pressure, the stem may be moved upward until an enlargement 30 provided adjacent the lower end, engages with a seat ring 31 threaded into an annular lug 32 formed internally of the body above the outlet passage 3. This definitely shuts off fluid flow to the upper portion of the bore 1a and the follower 28 may then be loosened and new packing inserted.

When it is desired to cause the stem to rotate while moving longitudinally, a special link or wrench 33, illustrated in Fig. 6, is secured to the nut 22. This wrench is provided at its outer ends with bosses or lugs 34 which, when the wrench is inverted from the position shown and placed on the nut 22, will engage the spokes of the hand wheel 21 and lock the stem 18 and the sleeve 20 together for rotation.

The wrench 33 may also be used when grinding the valve into the seat by placing the wrench on the nut 22 with the lugs 34 extending upward. The stem can then be rotated to cause the valve disk to rotate while engaging the seat.

For the purpose of securing the valve in place in a line, the inlet and outlet ends of the body include heavy flanges through which securing elements are adapted to pass.

While there has been shown and described a single embodiment of the invention, it will be understood that numerous slight changes may be made in the construction of the various parts without departing from the spirit and scope of the invention as defined in the following claims.

What is claimed is:

1. A control valve comprising a valve body having a central bore and fluid inlet and outlet passages communicating therewith at longitudinally spaced points, an annular tapering shoulder formed with said bore between the points of communication of said inlet and outlet passages therewith, a valve seat insert positioned in said bore, said insert being formed externally with an annular tapering shoulder engaging in fluid-tight relationship with the annular shoulder of said bore, a valve member movable axially of said bore into and out of fluid flow controlling engagement with the valve seat of said insert, the bottom of said bore being provided with internally disposed tapering threads, a packing sleeve having a tapered threaded end positioned within the internally threaded lower end of said bore, a stud received within said sleeve and having threaded engagement with the internal walls of said sleeve, the inner end of said stud being disposed for engagement with said valve seat insert to maintain the external tapering shoulder of said insert in fluid-tight engagement with the annular tapering shoulder of said bore, a packing carried by said sleeve and surrounding the smooth unthreaded portion of said stud, and a packing nut and follower threadedly carried by the outer end beyond said sleeve for controlling the compression on said packing, the outer end of said stud projecting beyond said nut and follower and provided with wrench receiving surfaces.

2. A control valve comprising a valve body having a central bore and inlet and outlet passages communicating therewith at longitudinally spaced points, an inwardly directed annular shoulder formed in said bore between the positions of communication of said passages therewith, a valve seat insert positioned in said bore, said insert being formed with an annular external shoulder arranged to directly engage the shoulder of said bore, said insert being removably positioned in said bore and formed with an internal passage uniting one of said first-named passages with said bore, said bore terminating at one end in a valve seat, a valve member movable into and out of fluid flow regulating engagement with said seat, the bottom of said insert being closed, a packing sleeve removably carried by the lower end of said valve body to close the bottom of said bore, an adjusting stud having threaded engagement with the inner walls of said sleeve, the inner end of said stud being directly engaged with the closed bottom of said insert to maintain the shoulder of the latter in fluid-tight engagement with the shoulder of said bore, a compressible packing arranged within said sleeve in engagement with a smooth walled portion of said stud, and a tightening nut and follower adjustably carried by said sleeve for regulating the compression on said packing, the outer end of said stud being extended beyond said nut and provided with polygonal wrench receiving surfaces to permit of the adjustment of said stud from the exterior of the valve body.

3. In a valve, a valve body formed with a central bore and inlet and outlet passages communicating with said bore at positions spaced longitudinally thereof, a shoulder formed in said bore between the communicating ends of said passages, a valve seating member removably positioned in said bore, said member being provided with an external shoulder arranged for direct engagement with the shoulder of said bore, said member being provided with a fluid port which registers at one end with one of said passages, the opposite end of said port being disposed in the longitudinal axis of said bore and formed to constitute a valve seat, a valve member adjustable axially of said bore and into and out of engagement with said valve seat, a shoulder formed on said valve member and operative when said valve member occupies its fully opened position to engage with a seat formed in the upper portion of said bore to preclude fluid seepage through and between the upper portion of said bore and said valve member, a packing carried by said valve body and surrounding said valve member, manually operated means for moving said valve member longitudinally, a threaded sleeve closing the lower end of said bore, an adjustable stud having threaded engagement with said sleeve and contacting with the lower face of said insert to maintain the shoulder of said insert in fluid-tight engagement with the first-named shoulder of said bore, a packing carried by said sleeve and surrounding a non-threaded portion of said stud, and means for maintaining said last-named packing under compression.

4. A control valve comprising a body provided with a central bore and inlet and outlet passages communicating with said bore at spaced points, an annular tapering shoulder formed in said bore between the points of connection of said inlet and outlet passages, a valve seat insert positioned in said bore, said insert being provided with an annular shoulder tapering in the same direction as the shoulder in said bore and engaging the same, means carried by said body for holding said insert in position, said means comprising a sleeve secured to said body, a stud adjustably carried by said sleeve, the inner end of said stud engaging said insert, packing means provided within said sleeve and surrounding said stud, a packing nut adjustably carried by said sleeve for controlling the compression on said packing, the outer end of said stud projecting beyond said nut and having wrench-receiving surfaces, and a valve member adjustably carried by said body for movement into and out of fluid flow controlling engagement with the valve seat of said insert.

HARRY B. REDDING.